(12) United States Patent
Lotito et al.

(10) Patent No.: US 9,086,263 B2
(45) Date of Patent: Jul. 21, 2015

(54) CARBON NANOTUBE HIGH TEMPERATURE LENGTH SENSOR

(75) Inventors: Michael S. Lotito, New Market, MD (US); Stergios J. Papadakis, Ellicott City, MD (US); Ned A. Brokloff, Ellicott City, MD (US)

(73) Assignee: The Johns Hopkins University, Baltimore, MA (US)

( * ) Notice: Subject to any disclaimer, the term of this patent is extended or adjusted under 35 U.S.C. 154(b) by 373 days.

(21) Appl. No.: 13/597,984

(22) Filed: Aug. 29, 2012

(65) Prior Publication Data

US 2013/0169293 A1 Jul. 4, 2013

Related U.S. Application Data

(60) Provisional application No. 61/581,178, filed on Dec. 29, 2011.

(51) Int. Cl.
| | | |
|---|---|---|
| *G01R 27/28* | (2006.01) | |
| *G01B 7/02* | (2006.01) | |
| *G01B 1/00* | (2006.01) | |
| *G01B 7/16* | (2006.01) | |
| *G01S 13/08* | (2006.01) | |
| *B82Y 15/00* | (2011.01) | |

(52) U.S. Cl.
CPC .. *G01B 7/02* (2013.01); *G01B 1/00* (2013.01); *G01B 7/16* (2013.01); *G01S 13/08* (2013.01); *B82Y 15/00* (2013.01)

(58) Field of Classification Search
CPC ........ G01R 31/11; G01R 31/08; G01R 31/21; G01R 31/085; G01R 31/083; G01R 31/088; G01R 31/3016; G01R 31/31937; G01R 31/31725; G01R 27/28; H04L 12/2697; H04L 43/50; H04B 3/462; H04B 3/46
USPC .......... 324/663, 617, 532–535, 644; 977/742, 977/953
See application file for complete search history.

(56) References Cited

U.S. PATENT DOCUMENTS

| | | | | |
|---|---|---|---|---|
| 4,766,386 | A | * | 8/1988 | Oliver et al. .................. 324/533 |
| 4,988,949 | A | * | 1/1991 | Boenning et al. ............. 324/541 |
| 6,104,200 | A | * | 8/2000 | Hook ............................ 324/643 |
| 6,317,540 | B1 | * | 11/2001 | Foulger et al. ............... 385/100 |
| 6,752,977 | B2 | | 6/2004 | Smalley et al. |
| 6,853,196 | B1 | * | 2/2005 | Barnum et al. ............... 324/543 |
| 7,008,563 | B2 | | 3/2006 | Smalley et al. |
| 7,076,374 | B2 | * | 7/2006 | Rogovin ......................... 702/59 |
| 7,157,990 | B1 | | 1/2007 | Adam et al. |
| 7,288,238 | B2 | | 10/2007 | Smalley et al. |

(Continued)

FOREIGN PATENT DOCUMENTS

| | | |
|---|---|---|
| WO | 2009/017859 | 2/2009 |
| WO | 2011/087411 | 7/2011 |

*Primary Examiner* — Huy Q Phan
*Assistant Examiner* — Thang Le
(74) *Attorney, Agent, or Firm* — Noah J. Hayward (57) ABSTRACT

A sensor assembly includes a carbon nanotube bundle and a controller. The carbon nanotube bundle is integrated into a host material and extends along a predetermined dimension of the host material. The controller is configured to control transmission of radio frequency energy through the carbon nanotube bundle to determine a round trip time between transmission and reception of the radio frequency energy at a proximal end of the carbon nanotube bundle responsive to reflection of the radio frequency energy at a distal end of the carbon nanotube bundle.

19 Claims, 3 Drawing Sheets

(56) References Cited

U.S. PATENT DOCUMENTS

| | | |
|---|---|---|
| 7,673,521 B2 | 3/2010 | Ajayan et al. |
| 8,266,335 B2 * | 9/2012 | Kitano et al. .................. 710/15 |
| 2001/0133031 | 6/2001 | Shah et al. |
| 2008/0258065 A1 | 10/2008 | Banks |
| 2009/0147695 A1 * | 6/2009 | Barkan et al. ................. 370/252 |
| 2011/0210749 A1 * | 9/2011 | Williams et al. ............... 324/543 |
| 2013/0050685 A1 * | 2/2013 | Hunt et al. ................... 356/73.1 |

* cited by examiner

CARBON NANOTUBE HIGH TEMPERATURE LENGTH SENSOR

CROSS-REFERENCE TO RELATED APPLICATIONS

This application claims priority to and the benefit of U.S. Provisional Application Ser. No. 61/581,178 filed on Dec. 29, 2011, the entire contents of which are hereby incorporated herein by reference.

STATEMENT OF GOVERNMENTAL INTEREST

This invention was made with U.S. Government support under contract number N00024-03-D-6606 awarded by Naval Sea Systems Command. The Government has certain rights in the invention.

TECHNICAL FIELD

Example embodiments generally relate to length sensing devices and, more particularly, relate to a device that can be embedded into a material that is expected to recede (through ablation, erosion or other mechanisms that remove material) and accurately measure the changing dimension(s) of the material while it recedes.

BACKGROUND

Dimensional measurements are very difficult to achieve where there are size limitations and/or in certain environments that are either hostile or dynamic (e.g., harsh). For example, only certain equipment or measuring modes may be suitable for hostile environments that may otherwise damage or destroy equipment that is not extremely robust. Meanwhile, in dynamic environments, the changing conditions may require continuous repositioning of equipment or perturbation of the measuring environment. Obtaining such measurements in environments that are both hostile and dynamic can be even more difficult.

In some cases, placing a sensor within a host material that is to be measured requires creating a hole or otherwise compromising a portion of the integrity of the host material. Thus, providing mechanisms by which to measure dimensional changes in certain host materials may weaken these materials in undesirable ways or allow for leakage and/or contamination. Similarly, placing a sensor that is robust enough to withstand certain harsh environmental conditions proximate to materials to be measured may alter certain physical properties of the material or flow conditions proximate to the material. Small sized host materials or narrow tolerances may also further complicate insitu measurements.

Many conventional sensors also measure current variations that could be interrupted or disrupted completely if the sensor is moved or conditions around the sensor are drastically changed. Thus, it should be appreciated that conventional sensors may have a difficult time providing accurate and useful measurements in numerous harsh environments.

BRIEF SUMMARY OF SOME EXAMPLES

Accordingly, some example embodiments may enable the provision of a sensor device that may be useful in measuring dimensional changes in host material. In this regard, some example embodiments may employ a carbon nanotube (CNT) bundle coupled to a radio frequency (RF) sensor where the CNT bundle can be embedded into homogeneous materials or wound into composite materials. As the host material ablates, erodes, recesses or otherwise changes shape, the CNT bundle will also change length accordingly due to processes similar to those that changed the shape of the host material. The CNT bundle will therefore have a length that is changing directly proportional to changes in the dimensions of the host material and may reflect the changes accordingly.

In one example embodiment, a sensor assembly is provided. The sensor assembly may include a carbon nanotube bundle and a controller containing a transmit/receive head, processing electronics, and power source. The carbon nanotube bundle may be integrated into a host material to extend along a predetermined dimension of the host material. The controller may be configured to control transmission of transmit radio frequency energy through the carbon nanotube bundle to determine a round trip time between transmission and reception of the radio frequency energy at a proximal end of the carbon nanotube bundle responsive to reflection of the radio frequency energy at a distal end of the carbon nanotube bundle.

In another example embodiment, a method of determining a dimensional measurement of a host material is provided. The method may include integrating a carbon nanotube bundle into the host material to extend along a predetermined dimension of the host material, and providing transmission of radio frequency energy through the carbon nanotube bundle to determine a round trip time between transmission and reception of the radio frequency energy at a proximal end of the carbon nanotube bundle responsive to reflection of the radio frequency energy at a distal end of the carbon nanotube bundle.

In another example embodiment, a component of an airfoil is provided. The component may include host material disposed to have at least one surface exposed to mechanisms causing surface recession, and a carbon nanotube bundle integrated into the host material to extend along a predetermined dimension of the host material. The carbon nanotube bundle may be configured to enable transmission of radio frequency energy through the carbon nanotube bundle to determine a round trip time between transmission and reception of the radio frequency energy at a proximal end of the carbon nanotube bundle responsive to reflection of the radio frequency energy at a distal end of the carbon nanotube bundle. The distal end of the carbon nanotube bundle may be proximate to at least one surface exposed to ablation.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some example embodiments may enable the provision of a temperature-resistant sensor that may be placed into a host material and change its length proportional to changes in a measured dimension of the host material. By using CNT bundles, a sensor may be provided by aligning a CNT bundle within the host material such that the CNT bundle extends in a direction relative to a dimension of the host material that is to be measured. In some cases, the direction may be substantially perpendicular to the dimension that is to be measured. However, in other cases, the orientation need not be perpendicular, nor does the CNT bundle need to extend in a straight line through the host material.

As the host material ablates, erodes, recesses or otherwise changes shape, the end of the CNT bundle that was disposed in the portion of the host material that has changed shape will be removed by the same processes that removed the corresponding host material. The CNT bundle length will therefore decrease in proportion to the amount of host material removed. The sensor may employ an RF transmitter/receiver to transmit RF energy along a length of the CNT bundle such that the RF energy is reflected back at the end of the CNT bundle where the shape change has occurred. By knowing the round trip time for the RF energy and the speed of the RF energy within the CNT bundle, the length of the CNT bundle may be determined. The change in length of the CNT bundle may represent the change in the corresponding dimension of the host material.

Figure 1:
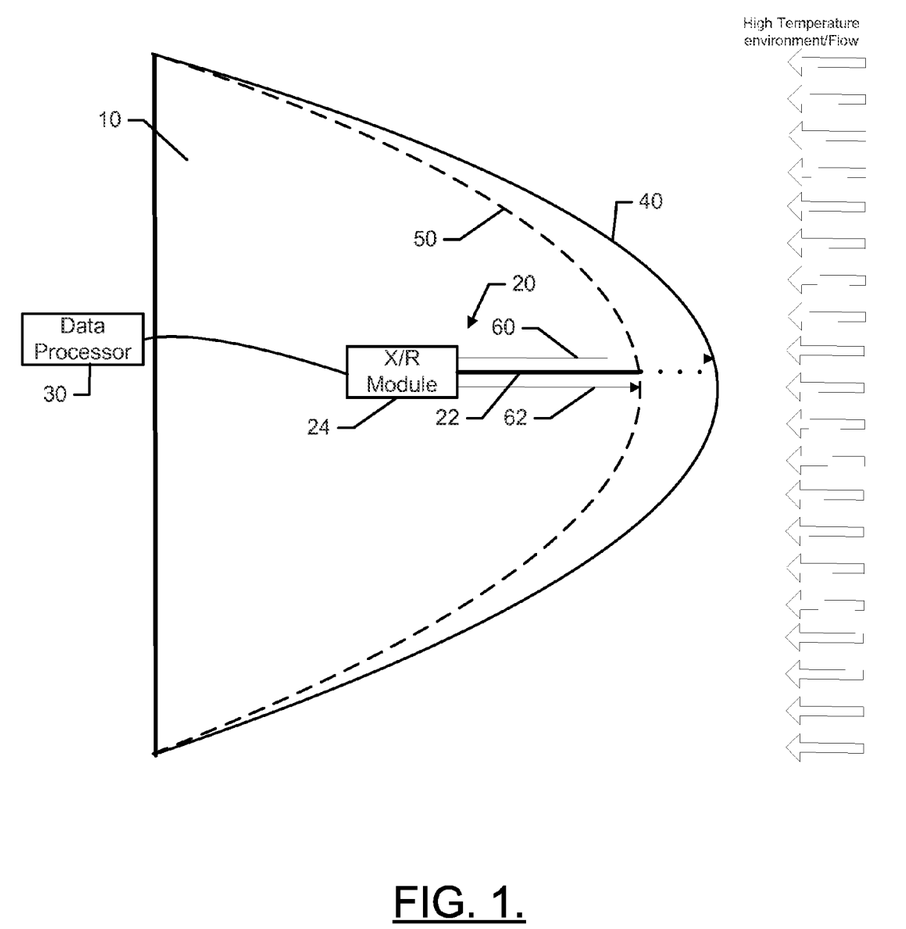
FIG. 1 is a side view of host material into which a sensor assembly according to an example embodiment may be integrated.

FIG. 1 illustrates an example of a host material 10 into which a sensor assembly 20 of an example embodiment may be installed. The sensor assembly 20 may include a CNT bundle 22 and a transmit/receive module 24. The transmit/receive module 24 may be in electrical communication with a data processor 30 (e.g., a controller) that could be disposed locally or remotely. The transmit/receive module 24 may be configured to transmit RF energy at any suitable frequency down a length of the CNT bundle 22. The transmit/receive module 24 may be further configured to receive reflected energy that has passed down a length of the CNT bundle 22 and reflected off a distal end thereof. In an example embodiment, a distal end of the CNT bundle 22 may be an end of the CNT bundle 22 that is exposed at a surface of the host material 10.

In some embodiments, the host material 10 may be any material that encounters or may possibly encounter dimensional changes that are desirable for measurement. For example, the host material 10 may be a homogeneous material or a composite material that is exposed to relatively harsh and/or dynamic environments. In particular, example embodiments may be useful in connection with very high temperature environments or environments that are highly erosive or consumptive where the dimensions of the host material may be expected to change in response to exposure of the host material to the environment. For example, the host material 10 may be a portion of a high speed body aeroshell, rocket motor propellant, rocket motor nozzle surfaces, interior furnace surfaces, space heat shield structures, nuclear reactor fuel rods, nuclear reactor control rods, turbine jet blades, ram jet components, and/or the like. In some cases, host material of airfoil components may be monitored using the sensor assembly 20 to measure shape changes in the host material. By measuring changes in the shapes of such components, a better understanding may be gained of how such components react to certain environments or change under certain corresponding conditions. As such, it may be appreciated that example embodiments may be employed on test bodies to determine characteristics of materials that will be used in non-test conditions later on. However, some embodiments may also be employed on non-test equipment that is actually in use. Accordingly, for example, some embodiments may provide data from the sensor assembly 20 that can be gathered during real-time operation of equipment. Moreover, in some embodiments, the real-time data may be used for control of the equipment being monitored.

Regardless of the circumstances under which example embodiments are employed, the sensor assembly 20 may be utilized to provide information regarding host material characteristics (e.g., dimensional measurements) during operation in harsh environments. When used in connection with components in any of the above listed, or other, harsh environments, the host material 10 may have an initial shape as indicated by solid profile line 40. After exposure of the host material 10 (e.g., due to high temperature and/or high flow conditions), the host material 10 may be eroded, recessed, ablated or otherwise may have its shape changed to the eroded shape indicated by dashed profile line 50 of FIG. 1. The difference between the solid profile line 40 and the dashed profile line 50 of FIG. 1 may indicate how much removed material has been ablated, eroded, recessed, etc., from the host material 10 due to the effects of the high temperature, high flow conditions, or other unfavorable conditions that cause shape change.

Of note, the term "initial" may represent a first or earlier time of measurement relative to some second or later time and does not necessarily need to reflect a time of or prior to first exposure of the host material 10 to a harsh environment. Similarly, the term "eroded" may represent a second or later time of measurement and need not refer to a final condition of the host material 10 after some amount of exposure. Thus, as used herein, the terms "initial" and "eroded" should be understood to correspond to earlier and later measurements (e.g., measurement at a first time and at a second time during, before or after exposure), respectively. It should also be noted that the specific shapes shown in FIG. 1 are merely example shapes and are not to be considered limiting in any way. Example embodiments may be employed in connection with components, materials, surfaces and/or the like that have any number of different shapes.

The CNT bundle 22 may have an initial length indicated by arrow 60. The length may be measured from a proximal end of the CNT bundle 22, which may be disposed farthest away from an exposed surface of the host material 10 (as represented by the eroded shape or initial shape dependent upon time), to a distal end of the CNT bundle 22, which may be disposed at the exposed surface of the host material 10. In an example embodiment, the proximal end of the CNT bundle 22 may also be closest to the transmit/receive module 24. Although the CNT bundle 22 is shown to extend relatively straight and nearly normal to the surface of the host material 10, it should be appreciated that the CNT bundle 22 may be deposited within the host material 10 in a way that provides for a curved path through the host material and/or extension away from the exposed surface of the host material 10 at any angle.

The CNT bundle 22 may be made of carbon nanotubes (CNTs) that are allotropes of carbon formed into cylindrical nanostructures. The CNTs may have a hollow structure and may be single walled or multi-walled structures that have extremely high length-to-diameter ratios. The CNT bundle 22 may be embedded within the host material 10, may be wound into the host material, or otherwise incorporated into the host material. Thus, for example, the CNT bundle 22 may not form any noticeable hole within the host material 10 such that leak-by could occur at an interface between the host material 10 and the CNT bundle 22. Instead, the CNT bundle 22 may essentially be integrally formed within the host material 10. The CNT bundle 22 may therefore act as a waveguide for transmission of RF energy within the host material 10 from the proximal end to the distal end thereof, and back to the proximal end. The round-trip travel time may be indicative of CNT bundle 22 length.

As heat or flow ablates, erodes, recesses or otherwise changes the shape of the host material 10 over time, the host material 10 may change its shape from that represented by the initial shape of solid line profile 40 to the eroded shape of the dashed line profile 50. The same processes that change the dimensions of the host material 10 may also remove the portions of the CNT bundle 22 that are within the removed material of the host material 10 such that the CNT bundle 22 may recede in its length to the eroded length indicated by arrow 62. The difference in length between arrow 60 and arrow 62 may be directly proportional to the change in dimension of the host material 10 responsive to erosion of the removed material. In some embodiments, the CNT bundle 22 may be extended substantially perpendicular to the surface of the host material 10 that is to have its corresponding dimensional characteristic measured in order to provide a more direct correlation between the difference in CNT bundle length and the dimensional change of the host material. However, the CNT bundle 22 does not necessarily need to extend substantially perpendicular to the surface of the host material 10.

The distal end of the CNT bundle 22 may be cauterized, worn away or otherwise ablated to substantially match a location of the exposed surface of the host material 10 that remains after exposure to heat, flow and/or other erosive forces. Thus, the distal end of the CNT bundle 22 may represent an impedance discontinuity that may reflect RF energy transmitted by the transmit/receive module 24 at the proximal end of the CNT bundle 22. The data processor 30 may be configured to measure or otherwise receive information indicative of a time difference between transmitting and receiving the RF energy by the data processor 30. The time difference may be indicative of the length of the CNT bundle 22 (e.g., based on knowledge of the speed of the RF energy in the medium of the CNT bundle 22). By comparing the time differences (and therefore also the corresponding lengths) at two different times, the data processor 30 may determine (directly or indirectly) an amount of change in length of the CNT bundle 22. In other words, the data processor 30 may be configured to determine the difference in length between arrow 60 and arrow 62. As such, for example, the data processor 30 may be configured to calculate, store, transmit and/or display the length change that has occurred between the initial shape and the eroded shape of the host material 10.

Figure 2:
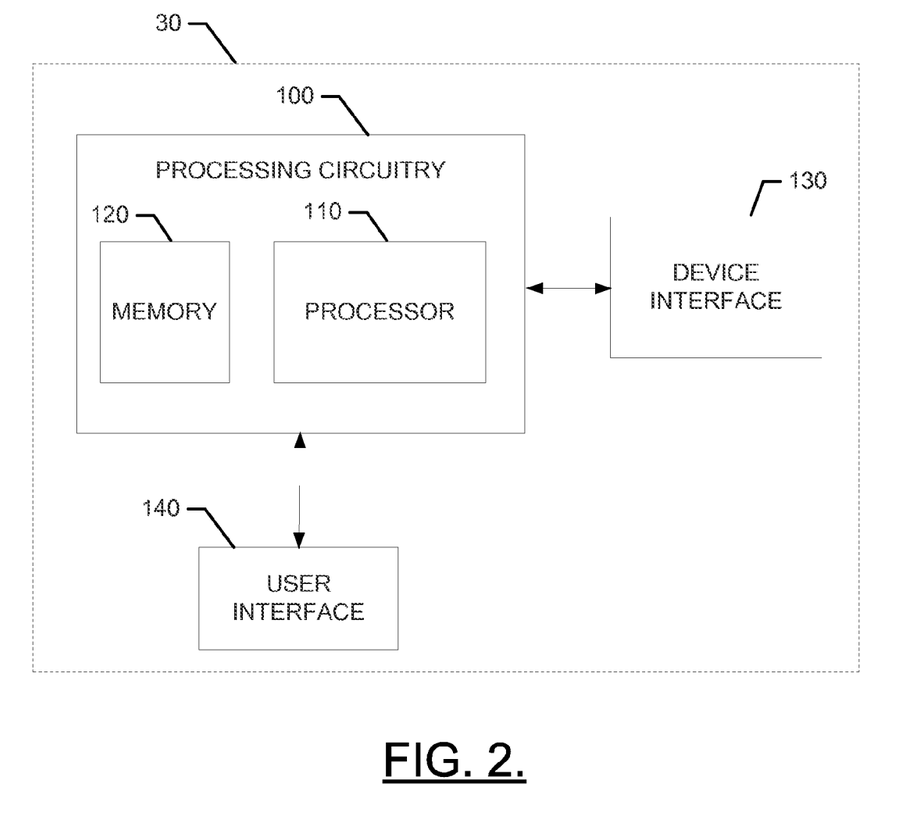
FIG. 2 illustrates a block diagram of a data processor that may be used in connection with some example embodiments.

FIG. 2 illustrates a block diagram of the data processor 30 that may be used in connection with some example embodiments. The data processor 30 may include or otherwise be in communication with processing circuitry 100 that is configurable to perform calculations and/or control functions in accordance with example embodiments described herein. As such, for example, the functions attributable to the data processor 30 may be carried out by the processing circuitry 100.

The processing circuitry 100 may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard). The processing circuitry 100 may be located on-board the vehicle, component, or material being monitored or may be remotely located.

In an example embodiment, the processing circuitry 100 may include one or more instances of a processor 110 and memory 120 that may be in communication with or otherwise control a device interface 130 and, in some cases, a user interface 140. As such, the processing circuitry 100 may be embodied as a circuit chip (e.g., an integrated circuit chip) configured (e.g., with hardware, software or a combination of hardware and software) to perform operations described herein.

The user interface 140 (if implemented) may be in communication with the processing circuitry 100 to receive an indication of a user input at the user interface 140 and/or to provide an audible, visual, mechanical or other output to the user. As such, the user interface 140 may include, for example, a display, one or more buttons or keys (e.g., function buttons), and/or other input/output mechanisms (e.g., keyboard, microphone, speakers, cursor, joystick, lights and/or the like). The user interface 140 (which may be remotely located) may be used by an operator to insert a signal to initiate a measurement (e.g., by signaling the transmit/receive module 24 to transmit down the CNT tube 22). The user interface 140 may also or alternatively display indications related to measurements previously made (e.g., CNT bundle length or material dimension indications; or indications regarding changes in CNT bundle length or material dimension).

The device interface 130 may include one or more interface mechanisms for enabling communication with other devices. In some cases, the device interface 130 may be any means such as a device or circuitry embodied in either hardware, or a combination of hardware and software that is configured to receive and/or transmit data from/to devices in communication with the processing circuitry 100 (e.g., the transmit/receive module 24). In some cases, the device interface 130 may be used to transmit locally gathered data (either raw or processed) to remote locations for processing, storage, display, analysis and/or the like. Additionally or alternatively, the device interface 130 may enable the processing circuitry 100 to interface with control systems of the component with which the host material 10 is associated. For example, the device interface 130 may enable sensor assembly 20 data to be provided to flight control systems of an operating missile, space craft and/or the like.

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the data processor 30 to carry out various functions in accordance with exemplary embodiments of the present invention. For example, the memory 120 could be configured to buffer input data for processing by the processor 110. Additionally or alternatively, the memory 120 could be configured to store instructions for execution by the processor 110. For example, the memory 120 may store instructions regarding timing and/or event triggers for initiating length measurements via the transmit/receive module 24. As yet another alternative, the memory 120 may include one or more databases that may store a variety of data sets indicative of measured CNT bundle lengths or material dimensions associated with corresponding different times. Current lengths and/or dimensions; trends in length and/or dimension changes; and/or the like may therefore be reported and/or analyzed. Among the contents of the memory 120, applications may be stored for execution by the processor 110 in order to carry out the functionality associated with each respective application. In some cases, the applications may include directions for control of the transmit/receive module 24 to achieve acquisition of desired data.

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware and software, the processor 110 may represent an entity (e.g., physically embodied in circuitry—in the form of processing circuitry 100) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the data processor 30. As such, in some embodiments, the processor 110 (or the processing circuitry 100) may be said to cause each of the operations described in connection with the data processor 30 by directing the data processor 30 to undertake the corresponding functionalities responsive to execution of instructions or algorithms configuring the processor 110 (or processing circuitry 100) accordingly.

The CNT bundle 22 is temperature resistant and also a conductor of RF energy with known properties. However, since the CNT bundle 22 erodes at its distal end along with the removed material, while also remaining intact at all other portions of the CNT bundle 22 even in harsh environments (e.g., in excess of 4000° F.), the CNT bundle 22 essentially provides a time variable indicator of a dimensional measurement of the host material 10 along the direction of extension of the CNT bundle 22. Thus, the CNT bundle 22 may be useful in connection with providing a sensor assembly 20 that is capable of providing dimensional measurements in very high temperature environments. Moreover, the small size of the CNT bundle 22 may enable the sensor assembly 20 to provide insitu measurements without environmental perturbation or leak by that could allow contamination or article destruction to occur. Measurements associated with consumption of rocket propellants during propellant burn or other extremely harsh environment measurements may therefore be conducted without any significant alteration of the material properties of the host material 10. Thus, for example, the thermal resistance, strength, structural integrity and other properties of the host material 10 may be relatively unchanged.

Figure 3:
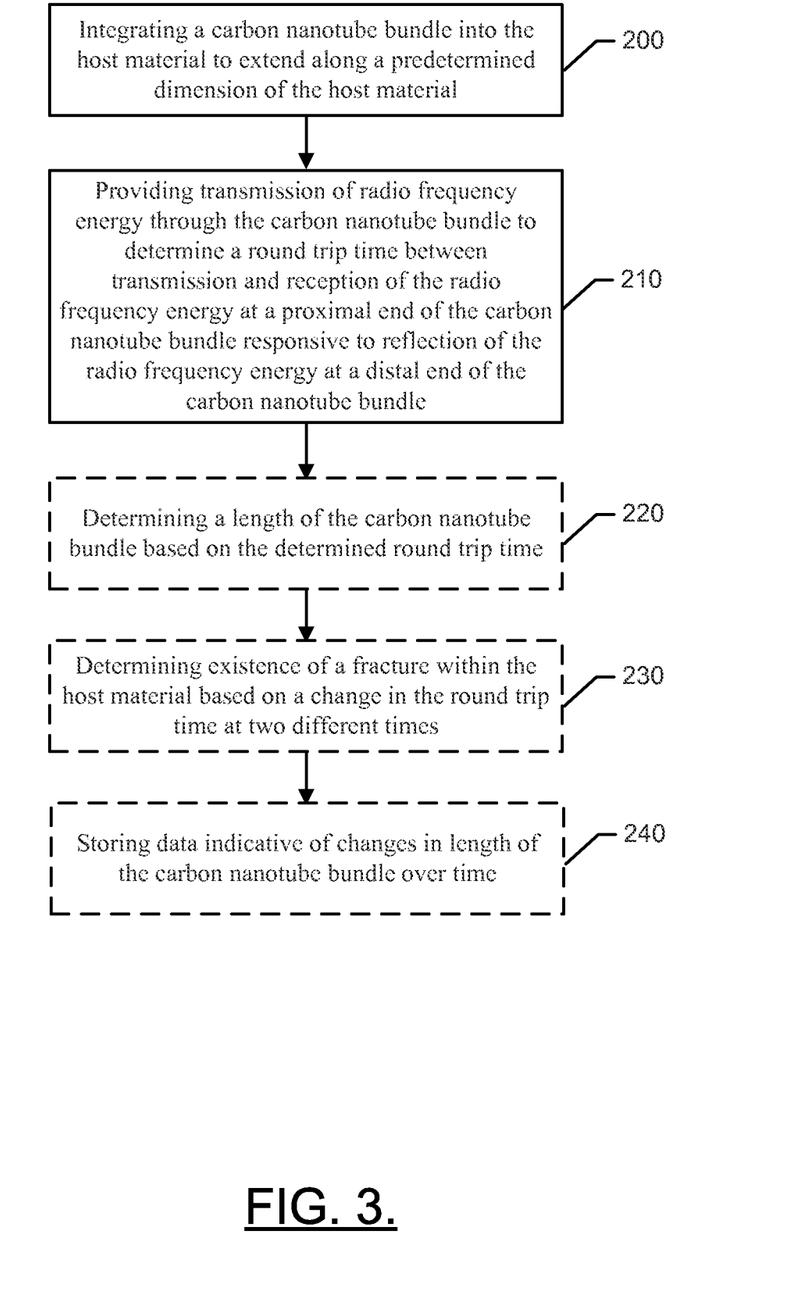
FIG. 3 illustrates a block diagram of a method of determining a dimensional measurement of a host material according to an example embodiment.

FIG. 3 illustrates a block diagram of a method of determining a dimensional measurement of a host material according to an example embodiment. The method may include integrating a carbon nanotube bundle into the host material to extend along a predetermined dimension of the host material at operation 200, and providing transmission of radio frequency energy through the carbon nanotube bundle to determine a round trip time between transmission and reception of the radio frequency energy at a proximal end of the carbon nanotube bundle responsive to reflection of the radio frequency energy at a distal end of the carbon nanotube bundle at operation 210. The operations above may be augmented or modified in some cases. Each augmentation or modification may be made independent of or in combination with each other alternative augmentation or modification. Some examples of modifications or augmentations are shown in FIG. 3 in dashed lines to distinguish that they may be optional operations. As an example, in some cases, the method may further include determining a length of the carbon nanotube bundle based on the determined round trip time at operation 220. Alternatively or additionally, the method may further include determining existence of a fracture within the host material based on a change in the round trip time at two different times at operation 230. As yet another alternative or additional option, the method may include storing data indicative of changes in length of the carbon nanotube bundle over time at operation 240.

Accordingly, some example embodiments may be provided to measure ablation or erosion in harsh or challenging environments such as, for example, in aviation, aerospace, nuclear or other applications. For example, some embodiments may be used in connection with relatively lightweight and inexpensive sensors that may measure wear on components such as brake pads, rotors, bearings, gears or other such surfaces or components in vehicles of various types. A plurality of sensor assemblies may be operated by one or more corresponding data processors and/or one or more corresponding transmit/receive modules. Multiple sensor assemblies may be positioned in different locations within a single component, or within different locations of a system by being placed in various different components to facilitate real time monitoring of the components during live operational scenarios. Accordingly, wear characteristics at various different locations of a single component or of components within a system may be measured and analyzed. Different wear characteristics associated with corresponding different stages of activity (e.g., flight stages) or locations within a system may therefore be appreciated and studied.

Some example embodiments may also be used in connection with the identification of stress fracture locations or other fractures in certain structures. For example, fiber optics with Bragg cells, optical time domain reflectometers and/or the like may be formed as a host material including CNT bundles similar to the example described above. In such cases, if a fracture occurs along a dimension of the host material, the CNT bundle may be used to identify the occurrence of the event and even isolate a location of the fracture. Similarly, CNT bundles of example embodiments may be provided within propeller blades, turbine blades, windmill blades, bridge span components and/or the like in order to identify the existence and perhaps also the location of stress fractures. For example, if the CNT bundle extends over the length of a bridge component (e.g., a girder) and an internal fracture is experienced for any reason, the CNT bundle may be expected to fracture at the same location of the internal fracture and therefore present an open end to reflect RF energy back at the open end. The time difference between normal conditions and the fractured condition may indicate the length along the component where the fracture has occurred.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A sensor assembly comprising:
   a carbon nanotube bundle integrated into a host material to extend along a predetermined dimension of the host material; and
   a controller configured to control transmission of radio frequency energy through the carbon nanotube bundle, wherein
   the controller determines a round trip time between transmission and reception of the radio frequency energy at a proximal end of the carbon nanotube bundle responsive to reflection of the radio frequency energy at a distal end of the carbon nanotube bundle,
   wherein the distal end of the carbon nanotube bundle is disposed proximate to an exposed surface of the host material, and
   wherein the carbon nanotube bundle length is changed along with the host material dimension at the exposed surface of the host material such that a change in shape of the host material along the predetermined dimension is proportional to a change in length of the carbon nanotube bundle.

2. The sensor assembly of claim 1, wherein a length of the carbon nanotube bundle is determinable based on the determined round trip time.

3. The sensor assembly of claim 2, wherein a change in shape of the host material along the predetermined dimension is determinable based on a comparison of lengths of the carbon nanotube bundle at different times.

4. The sensor assembly of claim 1, wherein a change in the round trip time is indicative of a one of a discontinuity and a fracture within the host material.

5. The sensor assembly of claim 1, wherein the carbon nanotube bundle is disposed in the host material of a component configured to be exposed to temperatures up to and greater than about 4000 degrees Fahrenheit.

6. The sensor assembly of claim 1, wherein the controller is configured to cause storage of data indicative of changes in length of the carbon nanotube bundle over time.

7. The sensor assembly of claim 1, wherein the change in length of the carbon nanotube bundle and the change in shape of the host material are each caused by ablation of the host material along the predetermined dimension.

8. The sensor assembly of claim 1, wherein the carbon nanotube bundle extends substantially perpendicular to the exposed surface of the host material.

9. A method of determining a dimensional measurement of a host material, the method comprising:
   integrating a carbon nanotube bundle into the host material to extend along a predetermined dimension of the host material; and
   providing transmission of radio frequency energy through the carbon nanotube bundle to determine a round trip time between transmission and reception of the radio frequency energy at a proximal end of the carbon nanotube bundle responsive to reflection of the radio frequency energy at a distal end of the carbon nanotube bundle,
   wherein the distal end of the carbon nanotube bundle is disposed proximate to an exposed surface of the host material, and
   wherein the carbon nanotube bundle length is changed along with the host material dimension at the exposed surface of the host material such that a change in shape of the host material along the predetermined dimension is proportional to a change in length of the carbon nanotube bundle.

10. The method of claim 9, further comprising determining a length of the carbon nanotube bundle based on the determined round trip time.

11. The method of claim 9, further comprising determining existence of a fracture within the host material based on a change in the round trip time at two different times.

12. The method of claim 9, further comprising storing data indicative of changes in length of the carbon nanotube bundle over time.

13. A component of an airfoil, the component comprising:
   host material disposed to have at least one surface exposed to ablation; and
   a carbon nanotube bundle integrated into the host material to extend along a predetermined dimension of the host material, the carbon nanotube bundle being configured to enable transmission of radio frequency energy through the carbon nanotube bundle to determine a round trip time between transmission and reception of the radio frequency energy at a proximal end of the carbon nanotube bundle responsive to reflection of the radio frequency energy at a distal end of the carbon nanotube bundle, the distal end being proximate to the at least one surface exposed to mechanisms that change surface dimensions,
   wherein ablation of the host material causes a change in shape of the host material and a corresponding change in length of the carbon nanotube bundle at the exposed surface of the host material such that the change in shape of the host material along the predetermined dimension is proportional to a change in the length of the carbon nanotube bundle.

14. The component of claim 13, wherein a length of the carbon nanotube bundle is determinable based on the determined round trip time.

15. The component of claim 13, wherein a portion of the change in shape of the host material along the predetermined dimension is determinable based on a comparison of lengths of the carbon nanotube bundle at two different times.

16. The component of claim 13, wherein a distal end of the carbon nanotube bundle is disposed proximate to an exposed surface of the host material.

17. The component of claim 13, wherein the component is configured to be exposed to temperatures up to and greater than about 4000 degrees Fahrenheit.

18. The component of claim 13, further comprising a controller in communication with the carbon nanotube bundle, the controller being configured to cause storage of data indicative of changes in length of the carbon nanotube bundle over time.

19. The component of claim 13, wherein the component comprises a plurality of sensor assemblies disposed to measure multiple respective dimensional characteristics of the host material.

* * * * *